US012718485B1

(12) United States Patent
Strandborg

(10) Patent No.: US 12,718,485 B1
(45) Date of Patent: Aug. 25, 2026

(54) FUSED IMAGE REPROJECTION AND OPTICAL DISTORTION CORRECTION

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/434,314

(22) Filed: Dec. 29, 2025

(51) Int. Cl.
*G06T 17/20* (2006.01)
*G06T 15/04* (2011.01)
*G06T 15/20* (2011.01)

(52) U.S. Cl.
CPC .............. *G06T 17/20* (2013.01); *G06T 15/04* (2013.01); *G06T 15/20* (2013.01)

(58) Field of Classification Search
None
See application file for complete search history.

(56) References Cited

U.S. PATENT DOCUMENTS 8,885,882 B1 * 11/2014 Yin ........................ G06V 40/19 382/103
10,048,749 B2 * 8/2018 Miao ...................... H04N 23/20
10,621,707 B2 * 4/2020 Dorbie ...................... G06T 3/00
2004/0169617 A1 * 9/2004 Yelton .................. G06T 15/005 345/1.1
2018/0150974 A1 * 5/2018 Abe .......................... G06T 7/74
2020/0302688 A1 * 9/2020 Hosfield ............... A63F 13/211
2020/0349754 A1 * 11/2020 Michielin ................. G06T 3/18
2021/0174539 A1 * 6/2021 Duong ...................... G06T 7/74
2021/0233207 A1 * 7/2021 Ha ....................... H04N 13/344
2022/0415076 A1 * 12/2022 Chen .................... G06V 10/803
2024/0161381 A1 * 5/2024 Cantero Clares ....... G06T 17/20

FOREIGN PATENT DOCUMENTS

CN 120276595 A * 7/2025 ............. G06V 40/10
WO WO-2024107744 A1 * 5/2024 ........... G06V 40/193

* cited by examiner

*Primary Examiner* — Jwalant Amin
(74) *Attorney, Agent, or Firm* — Ziegler IP Law Group, LLC.

(57) ABSTRACT

For a given position of a given eye, a mapping between a plurality of viewing-direction vectors originating therefrom and corresponding display locations on a display is generated. A mesh representing input content for the given position of the given eye is generated. For each vertex of the mesh, a reprojected vertex position is determined based on its position relative to a reference, a pose of the reference when the input content was generated, and a predicted pose of the reference at or proximate to a display time. A corresponding viewing-direction vector originating from the given eye and passing through the reprojected vertex position is determined. A distortion-corrected display location on the display is determined by applying the mapping to the corresponding viewing-direction vector. Vertices of the mesh are rasterized onto an image buffer for the given eye, using respective distortion-corrected display locations of the vertices.

18 Claims, 5 Drawing Sheets

FUSED IMAGE REPROJECTION AND OPTICAL DISTORTION CORRECTION

TECHNICAL FIELD

The present disclosure relates to display systems incorporating image reprojection and optical distortion correction. The present disclosure also relates to methods incorporating image reprojection and optical distortion correction.

BACKGROUND

Display systems are increasingly employed in applications where image content is presented to a user through an optical path that may include reflections, refractions, or both. Such systems may include virtual-reality (VR), augmented-reality (AR), extended-reality (XR), or other display configurations, and may employ one or more optical elements such as mirrors, lenses, waveguides, or optical combiners. In some systems, the optical path between a display and a given eye of a user includes one or more optical elements with non-planar or curved optical surfaces, for example curved mirrors or semi-reflective surfaces.

Due to such non-trivial optical paths, the apparent position and shape of presented image content as perceived by a given eye can be highly dependent on the position of that eye relative to the display and the one or more optical elements. In particular, optical distortion introduced by curved or angled optical surfaces may vary as a function of viewing direction, eye position, or both. As a result, image content that is presented in display space or image space may appear geometrically distorted or inconsistent across different viewing positions unless appropriate distortion correction is applied.

Separately, many display systems rely on tracking of user motion, including head or eye movement, to maintain a desired spatial relationship between the presented image content and the user. Due to processing latency associated with tracking, application logic, rendering, and display output, the image content to be presented may be generated based on a pose of a reference that differs from the pose at which the image content is ultimately presented. This discrepancy can cause apparent motion, positional error, or instability of presented image content, particularly when the image content is intended to maintain a stable spatial relationship relative to the user or to another reference.

Reprojection of the image content to compensate for such pose differences may require non-trivial geometric calculations. These challenges may be further exacerbated when the image content includes depth variation, perspective projection, or motion relative to an image plane, as changes in pose can result in non-uniform apparent motion across different regions of the image content.

Existing approaches address optical distortion correction and pose-based image reprojection using distinct processing stages within a rendering or composition pipeline. In some display systems, distortion correction is performed by evaluating the optical path independently for each display pixel, for example by determining, for a given pixel, a corresponding viewing direction toward a given eye and sampling input image data based on that viewing direction. Such per-pixel approaches may require solving the optical geometry separately for each pixel and may rely on iterative or search-based techniques when the optical path is complex or view-dependent.

When applied to systems incorporating view-dependent optical distortion, such as systems employing curved mirrors or other non-planar optical elements, determining appropriate relationships between viewing directions and display locations can be computationally expensive. More generally, the use of multiple processing stages for handling optical distortion and pose-related effects may require additional intermediate representations or processing steps, increasing computational cost, memory usage, or latency. Such overhead can be particularly problematic in systems that support multiple eyes, multiple users, or high update rates, or that operate under constraints on processing resources or power consumption.

Accordingly, there remains a need for improved techniques for handling optical distortion and pose-related reprojection in display systems employing non-trivial optical paths.

SUMMARY

The present disclosure seeks to provide a system and a method for handling optical distortion correction and pose-related reprojection for non-trivial optical paths in an efficient manner, thereby reducing processing latency, computational cost, and pose-related visual artifacts.

The aim of the present disclosure is achieved by a system and a method that, for a given position of a given eye, generate a mapping between viewing-direction vectors and corresponding display locations on a display, represent input content using a mesh whose vertices are reprojected based on poses of a reference at different times, and rasterize the mesh onto an eye-specific image buffer using distortion-corrected display locations derived from the mapping, such that the input content presented via a non-trivial optical path is perceived with reduced optical distortion and reduced pose-related error, as defined in the appended independent claims to which reference is made.

Advantageous features, including generation of the mapping based on propagation of viewing-direction vectors through an optical path, determination of display locations via reflection at a curved semi-reflective surface of an optical combiner, adaptive subdivision of a mesh based on image-content or optical-path characteristics, increased mesh density in regions associated with text or rapidly varying distortion, storage of the mapping as a lookup table with interpolation, and determination of a projection domain for parameterizing the mapping, are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
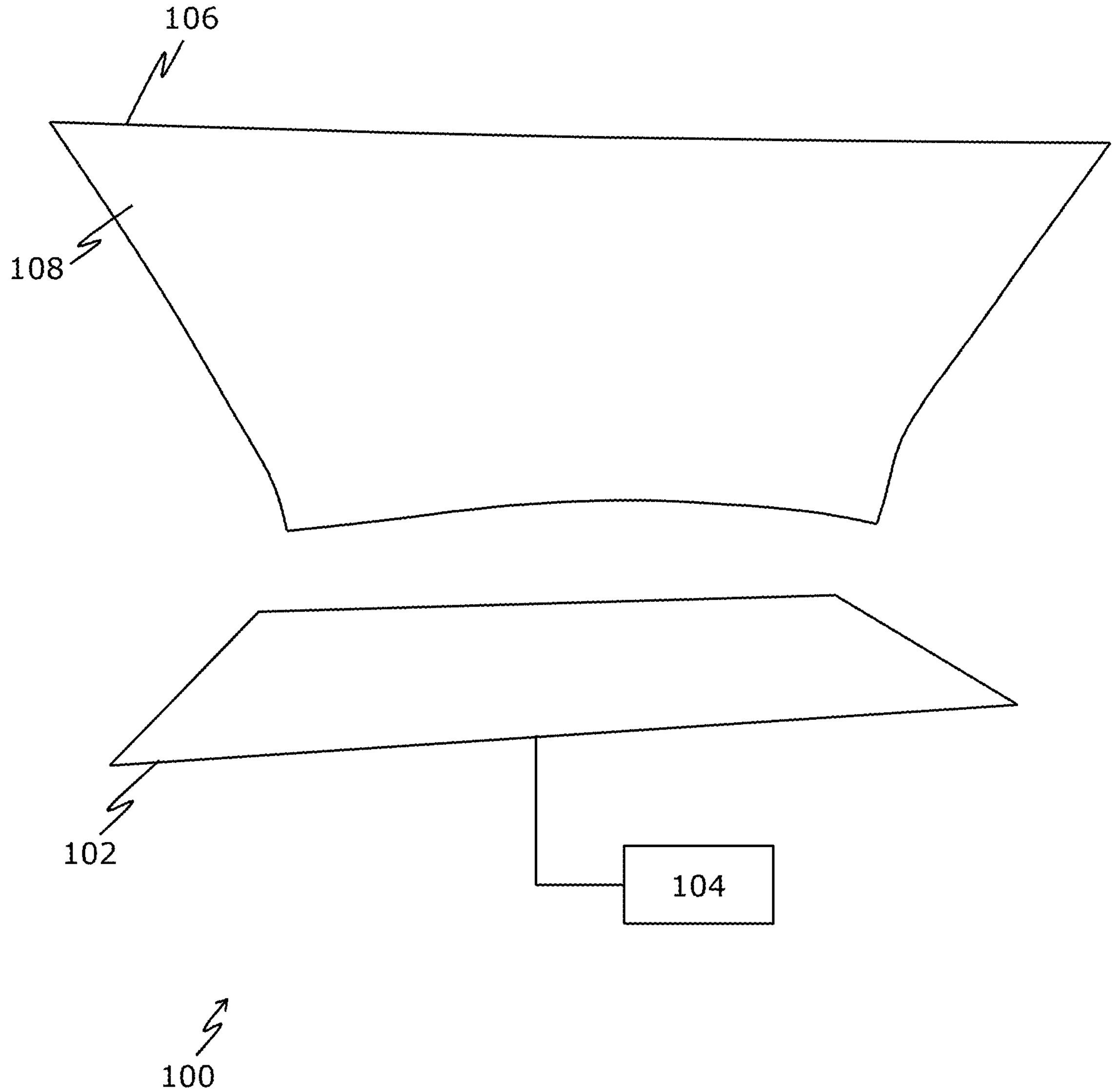
FIGS. 1A and 1B illustrate an example implementation of a system incorporating image reprojection and optical distortion correction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

a display; and at least one processor configured to:

- generate, for a given position of a given eye, a mapping between a plurality of viewing-direction vectors originating from the given eye and corresponding display locations on the display;
- generate a mesh representing input content for the given position of the given eye, the mesh comprising a plurality of vertices corresponding to respective locations on the input content;
- determine, for each vertex of the mesh, a reprojected vertex position based on a position of said vertex relative to a reference, a pose of the reference when the input content was generated, and a predicted pose of the reference at or proximate to a display time;
- determine, for each vertex, a corresponding viewing-direction vector originating from the given eye and passing through the reprojected vertex position;
- determine, for each vertex, a distortion-corrected display location on the display by applying the mapping to the corresponding viewing-direction vector; and
- rasterize the plurality of vertices of the mesh onto an eye-specific image buffer for the given eye, using respective distortion-corrected display locations of the plurality of vertices.

In a second aspect, an embodiment of the present disclosure provides a method comprising:

- generating, for a given position of a given eye, a mapping between a plurality of viewing-direction vectors originating from the given eye and corresponding display locations on a display;
- generating a mesh representing input content for the given position of the given eye, the mesh comprising a plurality of vertices corresponding to respective locations on the input content;
- determining, for each vertex of the mesh, a reprojected vertex position based on a position of said vertex relative to a reference, a pose of the reference when the input content was generated, and a predicted pose of the reference at or proximate to a display time;
- determining, for each vertex, a corresponding viewing-direction vector originating from the given eye and passing through the reprojected vertex position;
- determining, for each vertex, a distortion-corrected display location on the display by applying the mapping to the corresponding viewing-direction vector; and
- rasterizing the plurality of vertices of the mesh onto an eye-specific image buffer for the given eye, using respective distortion-corrected display locations of the plurality of vertices.

The present disclosure provides the aforementioned system and the aforementioned method for handling optical distortion correction and pose-related reprojection for non-trivial optical paths in a fused manner. By generating, for a given position of a given eye, a mapping between viewing-direction vectors and corresponding display locations, and by rasterizing a mesh representing the input content using reprojected vertex positions and their respective distortion-corrected display locations, the disclosed system and method enable accurate presentation of the input content through optical paths that include curved or otherwise non-planar optical elements.

A technical benefit of the disclosed system and method is that reprojection of the input content and compensation for optical distortion are performed at a geometric level that directly accounts for changes in the pose of the reference between generation and display of the input content. By determining, for each vertex of the mesh, a reprojected vertex position based on a pose of the reference when the input content was generated and a predicted pose of the reference at or proximate to the display time, the system and method reduce pose-related spatial error that would otherwise result from processing latency in tracking, rendering, and display pipelines. This enables more stable and spatially consistent presentation of the input content as perceived by the given eye.

Another technical benefit is that optical distortion introduced by a non-trivial optical path is compensated in a manner that is explicitly dependent on the viewing direction of the given eye. By determining, for each reprojected vertex, a corresponding viewing-direction vector originating from the given eye and applying the mapping to the corresponding viewing-direction vector to obtain a distortion-corrected display location, the system and method ensure that the input content is rendered in a way that is consistent with optical characteristics of the system as seen from the given position of the given eye. This leads to improved geometric fidelity and reduced view-dependent distortion compared to conventional approaches that assume a fixed or eye-independent distortion model.

A further technical benefit arises from representing the input content using the mesh and rasterizing the mesh onto an eye-specific image buffer using distortion-corrected display locations. This allows reprojection and optical distortion correction to be fused into a single coordinated processing stage during rasterization, reducing the need for multiple independent processing stages or intermediate representations of the input content. In contrast to approaches that determine, for each display pixel, a corresponding source location by evaluating the optical path on a per-pixel basis, the disclosed system and method operate in a forward, rasterization-based manner. Reprojection and optical distortion correction are applied at a vertex level prior to rasterization, and the resulting distortion-corrected display locations are used directly during rasterization of the mesh as part of the same processing stage. This avoids per-pixel optical-path evaluation and eliminates the need for intermediate render targets, while preserving geometric consistency of the input content under reprojection and optical distortion. As a result, the disclosed system and method can achieve improved efficiency and reduced processing overhead by leveraging geometric rasterization while maintaining accurate visual output for the given eye.

Collectively, these technical benefits enable precise, eye-dependent rendering of the input content through complex optical paths, with reduced optical distortion and reduced pose-related error, thereby improving visual stability and visual quality in display systems that operate under dynamic viewing conditions.

Throughout the present disclosure, the term "input content" refers to content provided for presentation by the system prior to application of reprojection and optical distortion correction. The input content may represent two-dimensional (2D) or three-dimensional (3D) content and may take any form suitable for presentation by the display. More generally, the input content may have any shape or structure that can be subdivided, represented, or approximated using a mesh comprising a plurality of vertices, such that reprojection and optical distortion correction can be applied at a vertex level as described herein. The input content may be generated, rendered, retrieved, or otherwise obtained. The input content may include, without limitation, raster images, perspective-projected views, textured geometric primitives, vector graphics, user-interface surfaces, or combinations thereof.

By way of illustration, there will now be described how the aforementioned steps can be performed pursuant to embodiments of the present disclosure.

Generating Mapping between Viewing-Direction Vectors and Display Locations:

For a given position of a given eye, a mapping between a plurality of viewing-direction vectors originating from the given eye and corresponding display locations on the display is generated. The mapping encodes, for the given position, a relationship between viewing directions from the given eye and locations on the display from which light, when emitted, propagates through an optical path of the system toward the given eye.

In some implementations, the given position of the given eye is determined using an eye tracker comprising one or more sensors, such as one or more cameras, photo sensors, infrared sensors, or other eye-tracking components. In other implementations, the given position of the given eye is estimated based on a tracked position of the user's head. The given position of the given eye may be expressed in a coordinate frame associated with the display (hereinafter interchangeably referred to as the "display-local coordinate frame"), in a coordinate frame associated with an optical element, or in a system-level coordinate frame.

The plurality of viewing-direction vectors comprise a set of direction vectors originating from the given position of the given eye and spanning a range of viewing directions relevant for the display. In some implementations, the viewing-direction vectors cover a continuous angular domain corresponding to an angular extent of the display as visible from the given eye. In other implementations, the viewing-direction vectors are sampled discretely, for example according to a predefined angular resolution.

For each viewing-direction vector, a corresponding display location on the display is determined by evaluating the optical path between the display and the given eye. In some implementations, when generating the mapping, the at least one processor is configured to, for each viewing-direction vector originating from the given eye:

propagate said viewing-direction vector through the optical path of the system to determine a corresponding propagated ray;

determine an intersection of the corresponding propagated ray with the display; and assign, to said viewing-direction vector, a display location on the display based on the intersection.

In this regard, the intersection may optionally be determined after one or more interactions of the propagated ray with one or more optical elements along the optical path. Such implementations account for optical effects introduced by the geometry and arrangement of the one or more optical elements along the optical path. This enables determination of display locations that accurately reflect how light emitted from the display propagates toward the given eye, improving geometric consistency of distortion correction in display systems employing lenses, mirrors, waveguides, optical combiners or other optical components.

In some implementations, the system further comprises an optical combiner arranged on an optical path of the display, wherein a semi-reflective surface of the optical combiner is curved, wherein when generating the mapping, the at least one processor is configured to, for each viewing-direction vector originating from the given eye:

determine an intersection of said viewing-direction vector with the semi-reflective surface of the optical combiner;

determine a corresponding reflection vector representing a reflection of said viewing-direction vector about a surface normal of the semi-reflective surface at the intersection; and determine a corresponding display location on the display at which the corresponding reflection vector intersects the display.

Such implementations explicitly account for view-dependent distortion introduced by the curvature of the semi-reflective surface of the optical combiner. By determining display locations based on reflected viewing-direction vectors, the mapping more accurately represents the optical behaviour experienced by light reflected toward the given eye, thereby improving alignment and geometric fidelity of presented content in systems employing curved optical combiners.

It will be appreciated that the optical path evaluated when generating the mapping is not limited to a single reflection or a single optical interaction, but may comprise an arbitrary sequence of optical effects occurring between the display and the given eye. Such optical effects may include, for example, one or more reflections at a semi-reflective surface of an optical combiner or at other reflective surfaces, refraction through one or more transmissive optical elements having non-negligible thickness, and combinations thereof.

In some implementations, the optical path includes reflection at the semi-reflective surface of the optical combiner as well as refraction through one or more optical elements arranged on the optical path, such as a lenticular array or other refractive structure positioned between the display and the given eye. While refraction introduced by such an optical element may be negligible for viewing directions close to normal incidence, it may vary with viewing angle and contribute to view-dependent optical distortion for oblique viewing directions.

More generally, the mapping between viewing-direction vectors and display locations is generated by evaluating the complete optical path of the system as a whole, irrespective of the number, type, or arrangement of optical elements along that path. The disclosed approach therefore applies equally to systems employing additional mirrors, lenses, waveguides, or other optical components, provided that propagation of viewing-direction vectors through the optical path can be evaluated. In all such cases, the resulting relationship between viewing-direction vectors and corresponding display locations is captured in the mapping.

A display location determined for a given viewing-direction vector may be expressed in any suitable coordinate representation, such as display-pixel coordinates, normalized display coordinates, or coordinates in a display-local coordinate frame. In some implementations, display locations corresponding to viewing-direction vectors that do not intersect the display through the optical path are also included in the mapping, for example with special values or out-of-range coordinates, in order to maintain continuity of the mapping across the angular domain of viewing-direction vectors.

In some implementations, the mapping includes display locations that lie outside a physical display region of the display. Such display locations may be represented using coordinate values that fall outside a nominal display coordinate range. For example, when display locations are expressed in normalized display coordinates, values outside a nominal [0, 1] range may be stored, including negative values or values greater than one, even though such values do not correspond to physical pixel locations on the display. Including such out-of-range display locations in the mapping preserves continuity of the mapping near boundaries of the display and avoids discontinuities or undefined behaviour when applying the mapping for viewing-direction vectors near or slightly beyond the angular extent of the display.

In some implementations, the mapping is generated based on a geometric model of the optical path, including descriptions of the display and the one or more optical elements. In other implementations, the mapping is generated using numerical techniques to determine display locations corresponding to respective viewing-direction vectors. In further implementations, the mapping is derived from precomputed calibration data associated with the system, optionally combined with the given position of the given eye.

In some implementations, determining an intersection of a propagated ray corresponding to a viewing-direction vector with an optical element or with the display comprises solving a ray-surface intersection problem using numerical techniques. Such techniques may include, by way of non-limiting example, iterative search methods, gradient-based methods, Newton-Raphson methods, or other surface-intersection techniques. Once an intersection point is determined, a reflected ray direction may be computed based on a surface normal of the optical element at the intersection, and a subsequent intersection with the display may be determined in a similar manner. These techniques are provided as examples only, and the present disclosure is not limited to any particular numerical method for evaluating the optical path.

The mapping may be represented in any suitable form, including a lookup table, a parameterized function, or another mathematical representation that maps viewing-direction vectors to display locations. The mapping may be generated at a resolution that is independent of the resolution of the input content or of an output image for display. It will be appreciated that the resolution of the mapping is chosen, such that it is sufficient to capture spatial variation of optical distortion across the display as seen from the given eye.

Generating Mesh Representing Input Content:

The input content provided for presentation by the system is represented using a mesh comprising a plurality of vertices corresponding to respective locations on the input content. The mesh provides a geometric representation of the input content that enables reprojection and optical distortion correction to be applied at a vertex level prior to rasterization.

In some implementations, the input content represents 2D content, such as an image mapped to an oriented quad or a perspective-projected view. In other implementations, the input content represents 3D content, such as one or more geometric primitives having associated texture mapping. Regardless of the form of the input content, the mesh is generated such that the input content can be decomposed or approximated using a plurality of vertices arranged in a manner suitable for subsequent rasterization. As an example, the mesh may be a triangle mesh in which groups of three vertices define triangular regions of the input content.

The vertices of the mesh correspond to respective locations on the input content in a coordinate representation associated with the input content, such as texture coordinates, image coordinates, or coordinates in a local content coordinate frame. In some implementations, the mesh is generated by subdividing the input content into a regular grid of vertices. In other implementations, the mesh is generated using a non-uniform distribution of vertices, provided that the resulting mesh adequately represents the geometry of the input content for subsequent processing.

In some implementations, the mesh is generated at a base resolution that is lower than a full display resolution of the display. The base resolution may be selected such that reprojection and optical distortion correction applied at the vertex level provide sufficient geometric accuracy when the mesh is subsequently rasterized. The resolution of the mesh may be selected independently of the resolution of the output image for display.

Determining Reprojected Vertex Positions:

For each vertex of the mesh, a reprojected vertex position is determined based on a position of the vertex relative to a reference, a pose of the reference when the input content was generated, and a predicted pose of the reference at or proximate to a display time. The reprojected vertex position represents an updated spatial position of the vertex that compensates for changes in the pose of the reference occurring between generation and display of the input content.

The reference may correspond to any suitable reference associated with the input content. In some implementations, the reference corresponds to an object, a surface, or a spatial anchor with which the input content is associated. For example, the reference may correspond to a user's head, a real-world coordinate frame, or a detected object whose pose is tracked over time, such as a vehicle or other moving object. The reference may itself be static or dynamic, but its pose may vary over time relative to a system-level coordinate frame.

The pose of the reference when the input content was generated represents a spatial configuration of the reference at a time at which the input content, or data from which the input content is derived, was generated. The predicted pose of the reference at or proximate to the display time represents an estimated spatial configuration of the reference at a time corresponding to presentation of the input content on the display. As used herein, the phrase "proximate to" a display time refers to a time close to the display time such that pose changes occurring between the predicted pose and an actual pose at the display time do not result in perceptible spatial error or visual instability of the presented content for a user. The predicted pose may be determined based on tracked motion of the reference, tracked motion of the user, or a combination thereof.

In some implementations, the predicted pose of the reference is obtained by extrapolating from one or more previously tracked poses of the reference. In other implementations, the predicted pose is obtained based on a motion model, a filtering technique, or a prediction algorithm. The manner in which the predicted pose is obtained is not limiting, provided that the predicted pose represents an estimate of the pose of the reference at or proximate to the display time.

For a given vertex of the mesh, the position of the vertex relative to the reference is known based on the representation of the input content. In some implementations, the position of a vertex relative to the reference is derived using depth information associated with the input content, such as a depth map corresponding to a perspective-projected view. In such cases, the depth information enables reconstruction of a 3D position of the vertex relative to the reference based on known rendering parameters used when the input content was generated. In other implementations, depth information may be unavailable or omitted. In such cases, the position of the vertex relative to the reference may be determined using a predefined depth value or distance assumption, such that the input content is treated as lying on a surface at a fixed distance (for example, 50 metres) relative to the reference. These examples are provided for illustrative purposes only, and the present disclosure is not limited to any particular technique for determining vertex positions relative to the reference.

The reprojected vertex position is determined by transforming the position of the vertex from a coordinate frame defined by the pose of the reference when the input content was generated into another coordinate frame defined by the predicted pose of the reference. This transformation accounts for changes in translation, rotation, or both, of the reference between these poses.

In some implementations, determining the reprojected vertex position comprises applying a rigid-body transformation derived from a relative transformation between the pose of the reference when the input content was generated and the predicted pose of the reference at or proximate to the display time. In other implementations, determining the reprojected vertex position comprises applying a non-rigid or composite transformation, for example when the reference undergoes more complex motion.

Determining Viewing-Direction Vectors for Reprojected Vertices:

For each vertex of the mesh, after determining the reprojected vertex position, a corresponding viewing-direction vector originating from the given eye and passing through the reprojected vertex position is determined. This viewing-direction vector represents a direction along which the reprojected vertex would be perceived from the given position of the given eye.

The given position of the given eye is expressed in a coordinate frame consistent with the coordinate frame used to express the reprojected vertex positions, such as a display-local coordinate frame, a system-level coordinate frame, or another suitable coordinate frame. The reprojected vertex position is likewise expressed in the same coordinate frame or is transformed into the same coordinate frame prior to determining the corresponding viewing-direction vector.

For a given vertex, the viewing-direction vector is determined based on a spatial relationship between the given position of the given eye and the reprojected vertex position. In some implementations, the viewing-direction vector is determined as a vector extending from the given position of the given eye toward the reprojected vertex position. The viewing-direction vector may be represented in any suitable form, for example as a direction vector, a ray direction, or an angular representation.

The viewing-direction vector determined for each vertex is associated with that vertex and represents a direction from the given eye toward the reprojected vertex position, which is opposite to a direction along which light corresponding to the vertex would propagate from the display toward the given eye through the optical path.

Determining Distortion-Corrected Display Locations:

For each vertex of the mesh, after determining the corresponding viewing-direction vector originating from the given eye and passing through the reprojected vertex position, a distortion-corrected display location on the display is determined by applying the mapping to the corresponding viewing-direction vector. The distortion-corrected display location represents a location on the display from which light, when emitted and propagated through the optical path, would reach the given eye.

The mapping applied for this purpose is the mapping generated for the given position of the given eye, which associates viewing-direction vectors originating from the given eye with corresponding display locations on the display. Applying the mapping comprises identifying, for the given viewing-direction vector, a corresponding display location indicated by the mapping.

In some implementations, the viewing-direction vector corresponds directly to one of the viewing-direction vectors for which the mapping was generated, whose corresponding display location is obtained directly from the mapping and used as the distortion-corrected display location for that vertex. In other implementations, the viewing-direction vector does not exactly coincide with a viewing-direction vector explicitly represented in the mapping. In such implementations, the mapping is applied in a manner that determines a corresponding display location that is consistent with the mapping, without requiring that the viewing-direction vector exactly match one of the plurality of viewing-direction vectors used when generating the mapping.

The distortion-corrected display location may be expressed in any suitable coordinate representation associated with the display, such as display-pixel coordinates, normalized display coordinates, or coordinates in a display-local coordinate frame. The distortion-corrected display location determined for a given vertex accounts for optical distortion introduced by the optical path between the display and the given eye, such that when the vertex is rasterized using the distortion-corrected display location, the corresponding portion of the input content is perceived from the given eye with reduced optical distortion.

Rasterizing Mesh onto Eye-Specific Image Buffer:

After determining, for each vertex of the mesh, a corresponding distortion-corrected display location on the display, the plurality of vertices of the mesh are rasterized onto an eye-specific image buffer for the given eye using the respective distortion-corrected display locations. The eye-specific image buffer represents image data to be perceived by the given eye when displayed via the display.

Rasterization comprises converting the geometric representation of the mesh, as defined by the plurality of reprojected vertices and their distortion-corrected display locations, into pixel values in the eye-specific image buffer. During rasterization, the distortion-corrected display locations of the reprojected vertices are used to determine corresponding regions of the eye-specific image buffer to which portions of the input content are mapped.

In some implementations, rasterization comprises determining which portions of the eye-specific image buffer correspond to regions defined by the distortion-corrected display locations of the plurality of vertices, and assigning pixel values of the eye-specific image buffer accordingly. Such pixel values may be determined based on attributes associated with the vertices of the mesh, including texture coordinates, colour values, or other per-vertex attributes derived from the input content.

The rasterization process may further include depth testing, clipping, or other geometric operations consistent with the representation of the input content, provided that such operations are applied using the distortion-corrected display locations determined for the vertices.

The eye-specific image buffer generated by this rasterization process represents the input content after reprojection and optical distortion correction for the given eye. When the eye-specific image buffer is displayed via the display, the input content is perceived by the given eye with reduced pose-related error and reduced optical distortion.

The aforementioned steps have been described with respect to the given eye. It will be appreciated that these steps can be performed similarly for each eye of each user of the system. Such implementations may include display systems that present a single image to multiple users, as well as display systems that present different images to respective eyes of each user.

Notably, the disclosed system and method are not limited to displays that present a single image to multiple users, but are also applicable to autostereoscopic display systems that present different images to respective eyes of each user. The system and method are scalable to scenarios involving multiple users or multiple eyes, as the aforementioned steps can be performed separately for each eye using corresponding eye positions and mappings. Such eye-specific processing enables presentation of respective input content for each eye. The disclosed system and method may be employed in a variety of display systems, including augmented-reality systems, driver information displays, and heads-up displays.

The system encompasses both stereoscopic displays and autostereoscopic or multiscopic displays. In stereoscopic implementations, such as head-mounted displays, the display may comprise separate display elements for respective eyes, and the optical path for each eye may include a respective optical combiner or other eye-specific optical elements. In such implementations, the mapping, mesh generation, reprojection, distortion-corrected display location determination, and rasterization steps described herein are performed separately for each eye using the corresponding display and optical path. In autostereoscopic or multiscopic implementations, a single display may present different image content to different eyes via a multiscopic optical element, and the same steps are performed for each eye using eye-specific mappings and eye-specific image buffers prior to combination for display. Accordingly, the disclosed system and method are applicable to display systems having separate displays and optical paths per eye, as well as to display systems in which multiple eye-dependent images are generated using a shared display and optical path.

In some implementations, the at least one processor is configured to:

combine eye-specific image buffers of different eyes of at least one user, to produce an autostereoscopic image; and provide the autostereoscopic image for display.

Each eye-specific image buffer represents image data intended to be perceived by a corresponding eye when displayed via the display. The combination of the eye-specific image buffers comprises arranging image data from respective eye-specific image buffers into the autostereoscopic image suitable for presentation by the display. The manner in which the eye-specific image buffers are combined depends on characteristics of the display and on how the display presents different image content to different eyes. In some implementations, combining the eye-specific image buffers comprises interleaving, multiplexing, or otherwise arranging pixel data from the eye-specific image buffers such that, when displayed, different portions of the autostereoscopic image are directed toward respective eyes.

The resulting autostereoscopic image represents a composite image that encodes eye-specific image data for the different eyes of the at least one user. The autostereoscopic image is then provided for display via the display, such that the display presents image content derived from the eye-specific image buffers in a manner that corresponds to the different eyes. Accordingly, in such implementations, the display is implemented as an autostereoscopic display. For example, the autostereoscopic display can be any of, or include, hogel-based, lenticular array-based, lenslet array-based, or parallax barrier-based implementations.

The combining and providing are performed repeatedly for successive eye-specific image buffers, such that updated autostereoscopic images are generated and displayed as the positions of the eyes or the input content change over time.

This provides a technical benefit in that eye-specific image buffers generated using reprojection and optical distortion correction are combined into an autostereoscopic image in a manner that preserves the eye-dependent geometric corrections performed earlier. By maintaining separate eye-specific image buffers up to the point of combination, the system avoids introducing cross-eye interference or geometric inconsistencies that can arise when eye-dependent processing is applied after images have already been combined.

Another technical benefit is that the combination of eye-specific image buffers enables scalable support for autostereoscopic displays without requiring changes to the underlying reprojection or distortion-correction pipeline. The same per-eye processing steps can be applied independently for each eye, and the resulting eye-specific image buffers can then be combined in a manner appropriate for the display. This modularity simplifies integration with different display architectures and supports systems with varying numbers of users or eyes.

A further technical benefit is that generating eye-specific image buffers prior to combination allows reprojection and optical distortion correction to be performed using eye-specific viewing geometry, while deferring display-specific formatting to a later stage. This reduces coupling between geometric correction logic and display formatting logic, improving system flexibility and reducing computational overhead when supporting different autostereoscopic display configurations.

Furthermore, optionally, when generating the mesh, the at least one processor is configured to adaptively subdivide at least a portion of the mesh based on at least one of:

a change in a depth value or a depth gradient across regions of the input content;

a change in a colour value or a colour gradient across regions of the input content;

a display-space size of at least a region of the input content; a change in a gradient of the mapping between viewing-direction vectors and display locations;

a curvature of a region of an optical element arranged on an optical path of the display;

a rate of change in a reflected ray direction at a semi-reflective surface of an optical combiner across adjacent viewing-direction vectors;

a distance of a vertex to a nearest boundary of the input content.

Adaptive subdivision comprises increasing a local density of vertices in selected portions of the mesh while maintaining a relatively lower density of vertices in other portions of the mesh. The adaptive subdivision is applied during mesh generation such that reprojection and optical distortion correction can subsequently be applied at a vertex level with spatial resolution that varies across the input content.

In some implementations, adaptive subdivision is performed based on the change in the depth value or the depth gradient across regions of the input content. Portions of the mesh that correspond to regions of the input content exhibiting larger depth variation may be subdivided more finely to better capture non-uniform reprojection effects resulting from changes in pose of the reference. Such depth-based subdivision aligns well with depth-map-based reprojection approaches, in which spatial variation in depth directly influences the magnitude and non-linearity of reprojection under pose changes.

In some implementations, adaptive subdivision is performed based on the change in the colour value or the colour gradient across regions of the input content. Portions of the mesh that correspond to regions of the input content exhibiting higher colour gradients, which typically correspond to regions of increased visual detail or sharp feature transitions, may be subdivided more finely to preserve visual detail after reprojection and optical distortion correction.

In some implementations, adaptive subdivision is performed based on the display-space size of at least a region of the input content. As used herein, the term "display-space size" refers to an area, extent, or span of the region of the input content after projection into display coordinates through the mapping. Portions of the mesh that correspond to regions of the input content occupying a larger area in the display space as perceived from the given position of the given eye may be subdivided more finely to improve geometric accuracy during rasterization.

In some implementations, adaptive subdivision is performed based on the change in the gradient of the mapping between viewing-direction vectors and display locations. Higher spatial variation in the mapping corresponds to regions of the input content where optical distortion changes more rapidly, and corresponding portions of the mesh may be subdivided more finely to better approximate such variation.

In some implementations, adaptive subdivision is performed based on the curvature of a region of an optical element arranged on the optical path of the display. Regions of the optical element with higher curvature may introduce greater distortion variation, as local curvature of the optical element directly influences local optical distortion experienced along the optical path. Adaptive subdivision of corresponding portions of the mesh improves the accuracy of distortion correction.

In some implementations, adaptive subdivision is performed based on the rate of change in a reflected ray direction at the semi-reflective surface of the optical combiner across adjacent viewing-direction vectors. The rate of change in the reflected ray direction depends on the given position of the given eye, the viewing direction associated with each viewing-direction vector, and the local geometry of the semi-reflective surface of the optical combiner. Portions of the mesh associated with higher rates of change may be subdivided more finely to better capture view-dependent distortion introduced by the semi-reflective surface.

In some implementations, adaptive subdivision is performed based on the distance of a vertex to a nearest boundary of the input content. Vertices that correspond to regions of the input content near a boundary may experience larger changes in distortion-corrected display locations when the mapping is applied, due to rapidly increasing optical distortion toward the boundary. Portions of the mesh near boundaries may therefore be subdivided more finely to reduce geometric error introduced when sampling the mapping near the boundaries.

The result of adaptive subdivision is a mesh in which the density of vertices (hereinafter interchangeably referred to as the "mesh density") varies across the input content, providing increased geometric resolution in portions where reprojection and optical distortion correction benefit from finer sampling, while maintaining lower complexity in portions where such refinement is not required.

In some implementations, adaptive subdivision of the mesh is performed dynamically during rendering using hardware-supported tessellation functionality. For example, the at least one processor may employ a graphics processing unit (GPU) tessellation stage to subdivide portions of the mesh on-the-fly based on the aforementioned subdivision criteria evaluated per frame. Using GPU-based tessellation enables dynamic adjustment of mesh density without requiring explicit regeneration of the mesh by the at least one processor, thereby supporting efficient, real-time subdivision aligned with changes in eye position, viewing direction, or optical distortion.

Such adaptive subdivision provides a technical benefit in that geometric resolution of the mesh is selectively increased only in portions where higher accuracy is beneficial for reprojection and optical distortion correction. This targeted refinement improves spatial fidelity of the rendered input content without uniformly increasing mesh complexity across an entirety of the input content.

Another technical benefit is that adaptive subdivision enables the mesh to better approximate non-linear variation in reprojection and optical distortion introduced by complex optical paths, curved optical elements, or view-dependent reflection behaviour. By aligning the mesh density with gradients of depth, colour, or optical distortion, the system reduces residual geometric error that can arise when a uniformly sampled mesh is used.

A further technical benefit is that adaptive subdivision reduces visible artifacts in perceptually sensitive regions of the input content, such as regions containing fine detail or sharp boundaries, while preserving computational efficiency. By avoiding unnecessary subdivision in portions of the mesh corresponding to regions of the input content where distortion varies slowly, the system reduces processing overhead associated with reprojection, mapping application, and rasterization.

Additionally, adaptive subdivision supports scalability across different display configurations and optical designs. The same reprojection and distortion-correction pipeline can be applied to meshes that are adaptively refined based on optical-path characteristics, allowing the system to accommodate displays with varying curvature, combiner geometry, or viewing conditions without requiring fundamental changes to the processing pipeline.

Moreover, optionally, when generating the mesh, the at least one processor is configured to increase the mesh density in portions in which distortion-corrected display locations of adjacent vertices differ by more than a predefined threshold. For adjacent vertices of the mesh, respective distortion-corrected display locations on the display are compared to evaluate a difference between those display locations. The difference between distortion-corrected display locations of adjacent vertices may be evaluated based on a distance or separation between the distortion-corrected display locations expressed in a display-space coordinate representation. Adjacent vertices whose distortion-corrected display locations differ by more than the predefined threshold are identified as belonging to portions of the mesh where spatial variation introduced by reprojection and optical distortion correction is relatively high.

Increasing the mesh density may comprise inserting additional vertices between adjacent vertices within the identified portions of the mesh, thereby subdividing those portions to provide finer vertex sampling.

The predefined threshold represents a criterion for determining when variation in distortion-corrected display locations cannot be sufficiently approximated using the existing mesh density. The predefined threshold may be selected based on characteristics of the display (for example, a display resolution, a pixel pitch, or a display size), characteristics of the optical path (for example, curvature or geometry of the one or more optical elements, or a degree of view-dependent distortion), or a desired level of geometric accuracy during rasterization (for example, a maximum tolerable display-space deviation between adjacent vertices), without being limited to a specific numerical value.

Increasing the mesh density in portions where distortion-corrected display locations of adjacent vertices differ by more than the predefined threshold provides a technical benefit in that non-linear spatial variation introduced by the mapping is more accurately captured at a vertex level. This reduces residual geometric error that can occur when large changes in distortion-corrected display locations are approximated using a coarse mesh.

Another technical benefit is that mesh refinement is driven directly by distortion-corrected display locations, rather than solely by properties of the input content. This allows the system to adapt the mesh density based on optical-path-induced distortion and reprojection effects, improving geometric fidelity in regions where optical distortion varies rapidly across the display.

A further technical benefit is that selectively increasing the mesh density avoids uniformly increasing mesh complexity across the entirety of the input content. By refining only those portions where distortion-corrected display locations vary beyond the predefined threshold, the system maintains computational efficiency while improving accuracy of reprojection and optical distortion correction during rasterization.

Additionally, this approach supports robustness across different optical configurations and viewing conditions. Because mesh density is adjusted based on distortion-corrected display locations derived from the mapping, the same processing pipeline can accommodate changes in eye position, optical-element geometry, or display characteristics without requiring redesign of the mesh generation strategy.

Furthermore, optionally, when generating the mesh, the at least one processor is configured to increase a mesh density for regions of the input content that correspond to text. The regions of the input content that correspond to text are identified during or prior to mesh generation. Text may include, for example, characters, glyphs, symbols, or alphanumeric elements that form words, labels, or other textual information within the input content.

Identification of the regions of the input content that correspond to text may be performed using information available at an input-content generation stage. In some implementations, such regions are identified based on metadata associated with the input content, such as layout information, rendering information, or application-level descriptors indicating which regions of the input content represent text. In other implementations, such regions are identified based on characteristics of the input content itself, such as geometric shape, font outlines, or other attributes indicative of text.

Increasing the mesh density may comprise inserting additional vertices within the portions of the mesh associated with the text regions, thereby providing finer vertex sampling in those portions relative to portions of the mesh corresponding to non-text regions.

The increased mesh density in portions corresponding to text regions allows reprojection and optical distortion correction to be applied with higher spatial resolution in those regions during subsequent processing and rasterization. Portions of the mesh corresponding to non-text regions may retain a relatively lower mesh density, provided that such mesh density is sufficient for accurate representation of those regions.

Increasing the mesh density for regions of the input content that correspond to text provides a technical benefit in that geometric distortions affecting text are more accurately corrected during reprojection and optical distortion correction. Text typically contains fine spatial detail and sharp edges, which are more susceptible to visible distortion or misalignment when represented using a coarse mesh.

Another technical benefit is that selective mesh refinement for text regions improves legibility and spatial stability of text after reprojection and distortion correction. By applying finer vertex sampling in portions of the mesh corresponding to text regions, the system reduces geometric artifacts such as warping, blurring, or uneven character spacing that can arise when text is subjected to view-dependent optical distortion.

A further technical benefit is that increasing the mesh density specifically for text regions avoids unnecessarily increasing mesh complexity across the entirety of the input content. By refining only those portions of the mesh corresponding to text, the system maintains computational efficiency while improving visual fidelity in regions where accurate geometric representation is particularly important.

Additionally, this approach supports consistent presentation of text across different viewing positions and optical configurations. Because mesh density for text regions is increased independently of the specific optical path or eye position, the same mechanism can be applied across different display systems and viewing conditions to ensure robust and readable text rendering after reprojection and optical distortion correction.

Moreover, in some implementations, the at least one processor is configured to:

store the mapping as a lookup table; and interpolate between entries of the lookup table when determining distortion-corrected display locations.

The lookup table comprises a plurality of entries, each entry associating a viewing-direction vector, or a parameterization thereof, with a corresponding display location on the display. The lookup table may be stored in a memory accessible to the at least one processor, such as a dedicated memory region, a cache, or a general-purpose memory. The lookup table may be generated for a given position of the given eye and updated when the given position of the given eye changes by more than a predefined amount.

To apply the mapping to determine a distortion-corrected display location for a given viewing-direction vector corresponding to a reprojected vertex of the mesh, the at least one processor accesses the lookup table from the memory. If the given viewing-direction vector corresponds directly to one of the entries in the lookup table, the corresponding display location is obtained directly from the lookup table and used as the distortion-corrected display location. If the given viewing-direction vector does not correspond exactly to a single entry in the lookup table, the at least one processor determines the distortion-corrected display location by interpolating between multiple entries of the lookup table. The interpolation is performed based on viewing-direction vectors represented by the entries and their associated display locations, such that the resulting distortion-corrected display location is consistent with the stored mapping.

Interpolation may be performed using any suitable interpolation technique, such as linear interpolation, bilinear interpolation, or higher-order interpolation, provided that the interpolation yields a display location that approximates the mapping for the given viewing-direction vector. The specific interpolation technique is not limiting and may be selected based on desired accuracy or computational cost.

The use of the lookup table enables repeated application of the mapping for multiple vertices of the mesh without recomputing the optical path for each viewing-direction vector. The lookup table may be reused across successive frames while the given position of the given eye remains within a range for which the stored mapping remains valid.

Storing the mapping as a lookup table provides a technical benefit in that determination of distortion-corrected display locations is performed using memory access and interpolation operations rather than repeated evaluation of the optical path. This reduces computational load associated with ray propagation or optical-path evaluation, particularly when the mapping is applied to a large number of vertices during rasterization.

Another technical benefit is that interpolation between entries of the lookup table enables accurate approximation of distortion-corrected display locations for viewing-direction vectors that are not explicitly represented in the stored mapping. This allows the mapping to be stored at a resolution that balances memory usage and computational efficiency while still providing sufficient accuracy for reprojection and optical distortion correction.

A further technical benefit is that the lookup-table-based approach supports predictable and bounded computational cost per vertex. Because determining distortion-corrected display locations involves table access and interpolation rather than iterative or search-based computation, the system achieves more deterministic performance, which is advantageous for real-time display systems operating under latency or power constraints.

Additionally, storing the mapping as a lookup table decouples generation of the mapping from its application during rasterization. This separation allows the mapping to be generated or updated at a different rate than vertex processing, improving system flexibility and enabling efficient reuse of the mapping across successive frames or multiple vertices of the mesh.

Additionally, optionally, when generating the mapping, the at least one processor is configured to:

determine a set of viewing-direction vectors that correspond to edges of the display;

determine a projection domain that encloses the set of viewing-direction vectors;

expand the projection domain by a predefined margin; and parameterize the plurality of viewing-direction vectors onto the expanded projection domain for storage in the lookup table.

Each viewing-direction vector in the set represents a viewing direction originating from the given position of the given eye and intersecting a respective edge of the display through the optical path. The determined set of viewing-direction vectors defines an angular extent of the display as visible from the given position of the given eye. Based on this set, the at least one processor determines the projection domain that encloses the viewing-direction vectors corresponding to the edges of the display. The projection domain represents a bounded domain within which viewing-direction vectors associated with the display are expected to lie.

As used herein, the "projection domain" refers to a mathematical projection space employed to parameterize viewing-direction vectors originating from the given position of the given eye into a 2D coordinate representation suitable for addressing entries of the lookup table. Viewing-direction vectors are defined on a spherical domain ($S^2$), such that each unit-length viewing-direction vector corresponds to a point on a unit sphere. The projection domain provides a mapping from a sub-region of this spherical domain to a bounded 2D domain, enabling storage of the mapping in the lookup table. As an example, the projection domain may be a perspective projection defining a view frustum that includes the viewing-direction vectors of the set as visible from the given position of the given eye. In some implementations, the projection domain corresponds to a parameterized view frustum from which projection parameters used for lookup-table indexing are derived.

Expanding the projection domain provides a guardband beyond the nominal angular extent of the display, accommodating small variations in eye position, numerical imprecision, and reprojection effects. This guardband reduces the likelihood of undefined mapping behaviour near display boundaries and prevents viewing-direction vectors or vertices near the edges of the input content from being mapped outside the lookup table domain. The predefined margin may be selected based on expected variation in eye position, numerical stability considerations, reprojection effects, or desired robustness of the mapping.

The plurality of viewing-direction vectors used to generate the mapping are parameterized onto the expanded projection domain for storage in the lookup table. Parameterization comprises mapping viewing-direction vectors to coordinates within the expanded projection domain, such that each viewing-direction vector is represented in a form suitable for indexing or addressing entries of the lookup table. Each entry of the lookup table thus associates a parameterized viewing-direction vector with a corresponding display location on the display.

The parameterization may be performed using any suitable projection or mapping technique, provided that the resulting parameterization preserves relative relationships between viewing-direction vectors within the expanded projection domain. The specific form of parameterization is not limiting, as long as the parameterized representation enables storage and retrieval of corresponding display locations from the lookup table.

Notably, the projection domain and the expanded projection domain are used solely for storage and application of the mapping between viewing-direction vectors and display locations. No intermediate image is rendered into the projection domain. Instead, reprojection of the input content and optical distortion correction are applied directly at a vertex level, and rasterization is performed using the resulting distortion-corrected display locations in a single fused processing stage. This preserves the fused nature of the reprojection and distortion-correction pipeline, while enabling robust lookup-table-based evaluation of the optical path.

Determining viewing-direction vectors corresponding to edges of the display and defining a projection domain that encloses those vectors provides a technical benefit in that the lookup table is bounded to a domain that directly corresponds to the visible extent of the display for the given position of the given eye. This avoids allocating lookup table entries for viewing directions that are not relevant to the display, thereby improving memory efficiency.

Expanding the projection domain by the predefined margin provides a further technical benefit by increasing robustness of the mapping. The expanded projection domain accommodates small changes in eye position, numerical imprecision, or reprojection effects that may cause viewing-direction vectors to fall slightly outside the nominal display extent. This reduces edge-related artifacts and avoids undefined behaviour when applying the mapping near display boundaries.

Parameterizing the plurality of viewing-direction vectors onto the expanded projection domain provides an additional technical benefit by enabling efficient indexing and interpolation within the lookup table. By representing viewing-direction vectors in a bounded and structured domain, the system facilitates predictable access patterns and efficient interpolation between entries when determining distortion-corrected display locations.

Another technical benefit is that the projection-domain-based parameterization decouples the internal representation of viewing-direction vectors from their original geometric form. This abstraction simplifies lookup table implementation and supports reuse of the same mapping framework across different display sizes, optical configurations, or eye positions, without requiring changes to the underlying reprojection and distortion-correction pipeline.

Collectively, these features improve robustness, efficiency, and scalability of the lookup-table-based mapping, particularly in systems that operate under real-time constraints or that support dynamic viewing conditions.

The present disclosure also relates to the method as described above. Various embodiments and variants disclosed above, with respect to the aforementioned first aspect, apply mutatis mutandis to the method.

Optionally, the method further comprises:

combining eye-specific image buffers of different eyes of at least one user, to produce an autostereoscopic image; and providing the autostereoscopic image for display.

A technical benefit of this is that eye-dependent reprojection and optical distortion correction are preserved up to the point of display. By deferring combination until after generation of the eye-specific image buffers, the method avoids cross-eye geometric interference and maintains accurate viewing-direction-dependent correction for each eye. This enables scalable support for autostereoscopic presentation while preserving geometric fidelity under dynamic viewing conditions.

In some implementations, generating the mapping comprises, for each viewing-direction vector originating from the given eye:

propagating said viewing-direction vector through an optical path of a system to determine a corresponding propagated ray, the system comprising the display;

determining an intersection of the corresponding propagated ray with the display; and assigning, to said viewing-direction vector, a display location on the display based on the intersection.

A technical benefit of this is that the resulting display locations inherently encode the full optical behaviour of the system as perceived from the given eye. By assigning display locations based on ray-display intersections, the mapping directly captures view-dependent distortion introduced by the optical path. This enables accurate distortion correction without requiring per-pixel optical-path evaluation during rasterization.

In some implementations, generating the mapping comprises, for each viewing-direction vector originating from the given eye:

determining an intersection of said viewing-direction vector with a semi-reflective surface of an optical combiner arranged on an optical path of the display, wherein the semi-reflective surface is curved;

determining a corresponding reflection vector representing a reflection of said viewing-direction vector about a surface normal of the semi-reflective surface at the intersection; and determining a corresponding display location on the display at which the corresponding reflection vector intersects the display.

A technical benefit of this is that view-dependent distortion introduced by the optical combiner is explicitly captured as part of the mapping. By determining display locations based on reflected viewing-direction vectors, the system accurately models curvature-induced distortion as perceived from the given eye. This improves geometric fidelity of the presented input content without requiring iterative distortion correction during rasterization.

Moreover, optionally, generating the mesh comprises adaptively subdividing at least a portion of the mesh based on at least one of:

a change in a depth value or a depth gradient across regions of the input content;

a change in a colour value or a colour gradient across regions of the input content;

a display-space size of at least a region of the input content;

a change in a gradient of the mapping between viewing-direction vectors and display locations;

a curvature of a region of an optical element arranged on an optical path of the display;

a rate of change in a reflected ray direction at a semi-reflective surface of an optical combiner across adjacent viewing-direction vectors;

a distance of a vertex to a nearest boundary of the input content.

A technical benefit of this is that geometric resolution of the mesh is increased only where reprojection and optical distortion vary most rapidly. This selective refinement improves accuracy of distortion correction and reprojection in perceptually sensitive or optically complex regions. At the same time, it avoids unnecessary mesh complexity elsewhere, preserving computational efficiency during rasterization.

Furthermore, optionally, generating the mesh comprises increasing a mesh density in portions in which distortion-corrected display locations of adjacent vertices differ by more than a predefined threshold. This reduces geometric error and visual artifacts that would otherwise arise when large display-space deviations are approximated using a coarse mesh. By applying refinement only where the predefined threshold is exceeded, this approach preserves computational efficiency while improving visual fidelity.

Moreover, optionally, generating the mesh comprises increasing a mesh density for regions of the input content that correspond to text. A technical benefit of this is that geometric distortions affecting fine textual features are more accurately corrected during reprojection and optical distortion correction. Selective refinement of text regions improves legibility and spatial stability while avoiding unnecessary increases in mesh complexity for non-text regions.

Furthermore, optionally, the method further comprises:

storing the mapping as a lookup table; and interpolating between entries of the lookup table when determining distortion-corrected display locations.

A technical benefit of this is that distortion-corrected display locations are determined using lookup and interpolation rather than repeated evaluation of the optical path, lowering computational cost while maintaining accuracy for viewing-direction vectors not explicitly stored.

Additionally, optionally, generating the mapping comprises:

determining a set of viewing-direction vectors that correspond to edges of the display;

determining a projection domain that encloses the set of viewing-direction vectors;

expanding the projection domain by a predefined margin; and parameterizing the plurality of viewing-direction vectors onto the expanded projection domain for storage in the lookup table.

A technical benefit of this is that the lookup table is bounded to a domain that matches the visible extent of the display while remaining robust to edge conditions. Parameterizing viewing-direction vectors onto the expanded projection domain enables reliable indexing and interpolation near display boundaries, reducing artifacts caused by rapid distortion variation.

DETAILED DESCRIPTION OF THE DRAWINGS

Figure 1B:
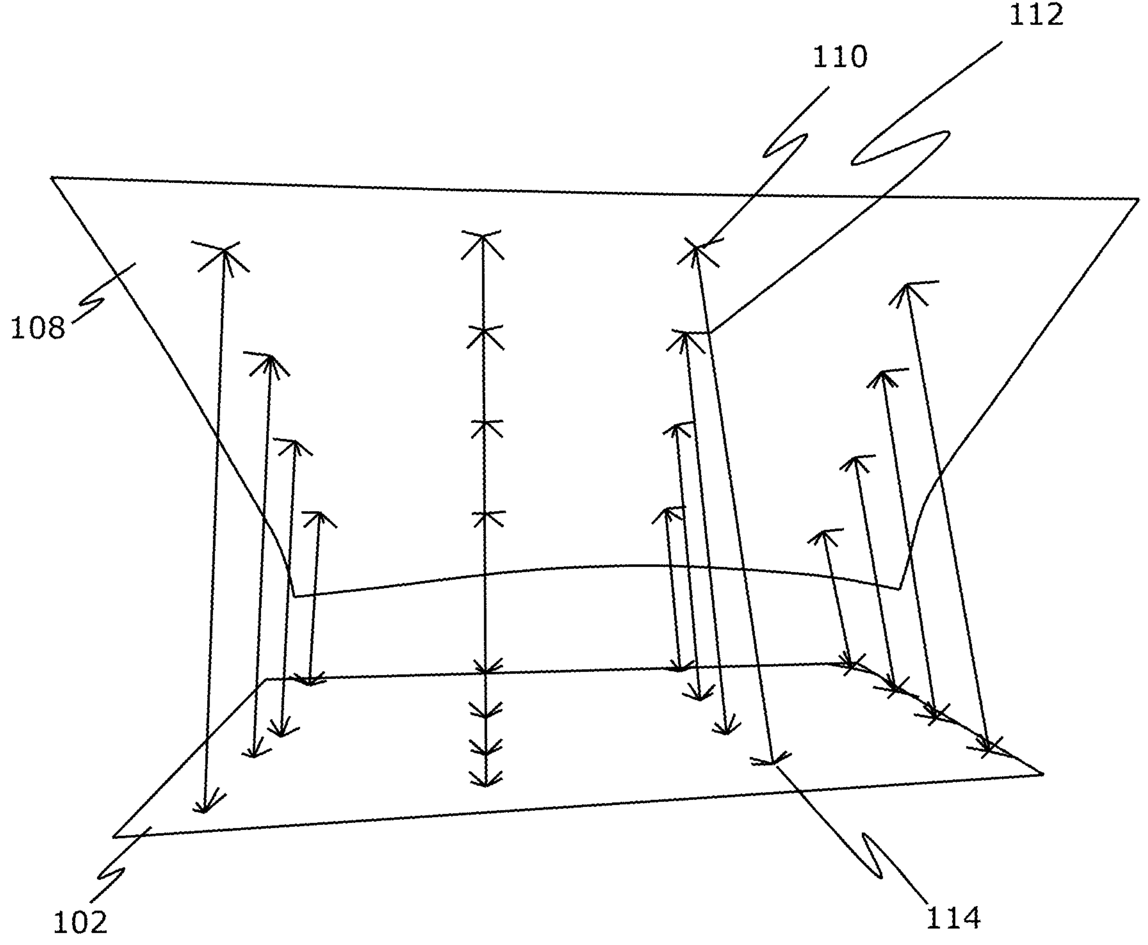

Referring to FIGS. 1A and 1B, illustrated is an example implementation of a system 100 incorporating image reprojection and optical distortion correction, in accordance with an embodiment of the present disclosure. The system 100 comprises a display 102 and at least one processor, depicted as a processor 104. The processor 104 is configured to:

generate, for a given position of a given eye, a mapping between a plurality of viewing-direction vectors originating from the given eye and corresponding display locations 114 on the display 102;

generate a mesh representing input content for the given position of the given eye, the mesh comprising a plurality of vertices corresponding to respective locations on the input content;

determine, for each vertex of the mesh, a reprojected vertex position based on a position of said vertex relative to a reference, a pose of the reference when the input content was generated, and a predicted pose of the reference at or proximate to a display time;

determine, for each vertex, a corresponding viewing-direction vector originating from the given eye and passing through the reprojected vertex position;

determine, for each vertex, a distortion-corrected display location on the display 102 by applying the mapping to the corresponding viewing-direction vector; and rasterize the plurality of vertices of the mesh onto an eye-specific image buffer for the given eye, using respective distortion-corrected display locations of the plurality of vertices.

Optionally, the system 100 further comprises at least one optical element, depicted as an optical element 106, arranged on an optical path of the display 102. For illustration purposes only, the optical element 106 is shown as an optical combiner having a semi-reflective surface 108, which is curved.

Optionally, when generating the mapping, the processor 104 is configured to, for each viewing-direction vector originating from the given eye:

determine an intersection 110 of said viewing-direction vector with the semi-reflective surface 108;

determine a corresponding reflection vector 112 representing a reflection of said viewing-direction vector about a surface normal of the semi-reflective surface 108 at the intersection 110; and determine a corresponding display location 114 on the display 102 at which the corresponding reflection vector 112 intersects the display 102.

Figure 1C:
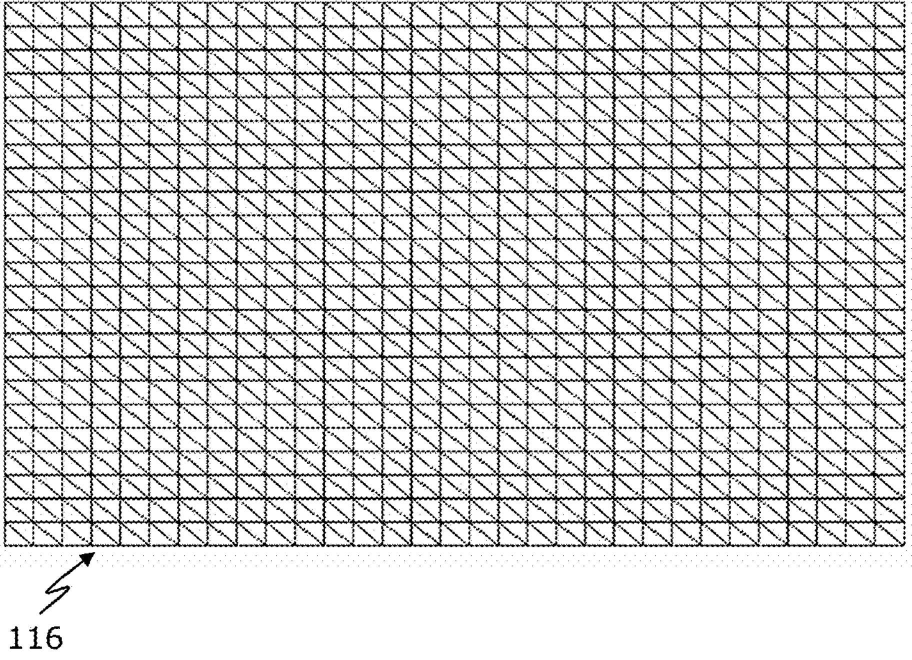
FIG. 1C depicts a mesh representing input content for a given position of a given eye, in accordance with an embodiment of the present disclosure.

FIG. 1C depicts a mesh 116 representing the input content for the given position of the given eye, in accordance with an embodiment of the present disclosure. The mesh 116 comprises a plurality of vertices corresponding to respective locations on the input content. The mesh 116 is shown as a triangular mesh, for illustration purposes only.

Figure 1D:
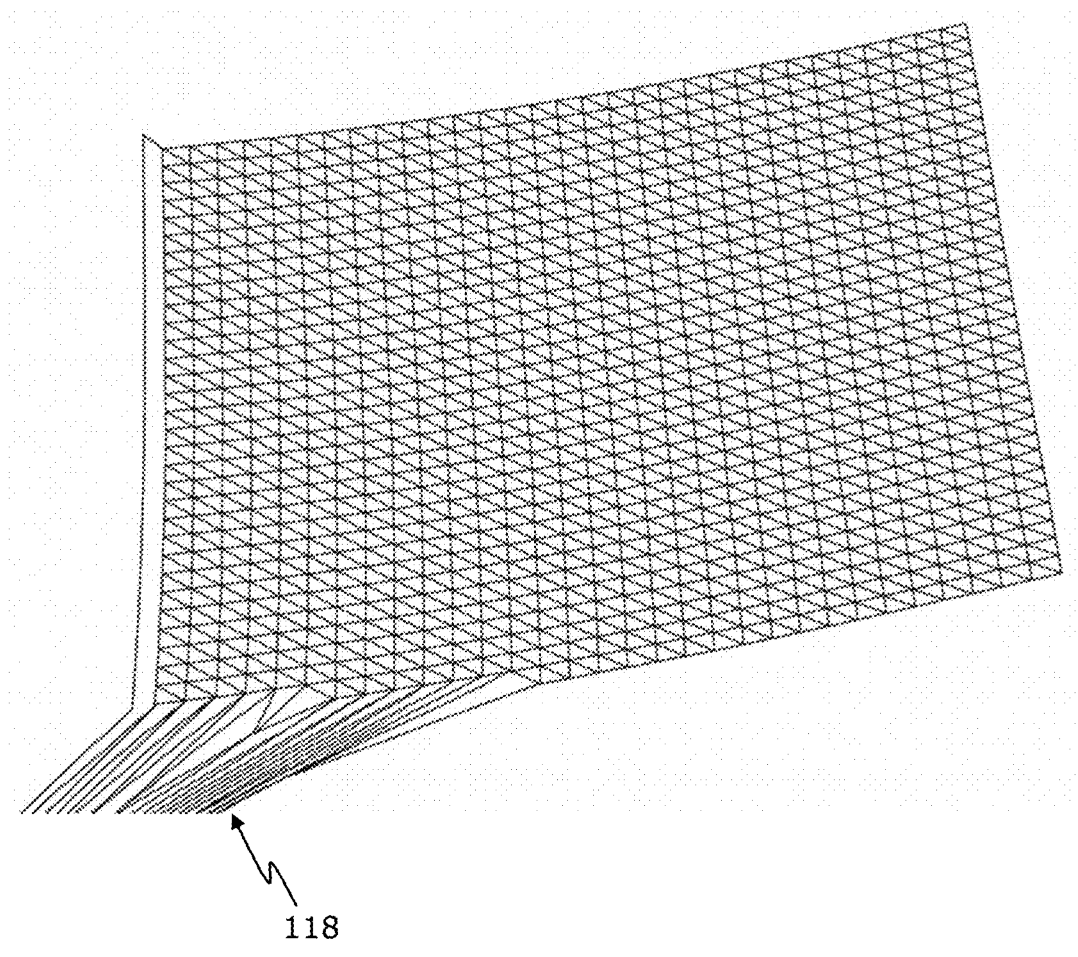
FIG. 1D depicts a plurality of vertices of the mesh at their respective reprojected vertex positions, in accordance with an embodiment of the present disclosure.

FIG. 1D depicts the plurality of vertices of the mesh 116 at their respective reprojected vertex positions, in accordance with an embodiment of the present disclosure. These reprojected vertex positions are used to determine corresponding viewing-direction vectors originating from the given eye and passing through the respective reprojected vertex positions, and to determine respective distortion-corrected display locations on the display 102 by applying the mapping to the corresponding viewing-direction vectors, prior to rasterization. With reference to FIG. 1D, vertices positioned at a lower-left corner 118 of the mesh 116 are displaced outward in a skewed manner relative to the display coordinate frame. This depicts that the distortion-corrected display locations corresponding to these vertices lie outside a physical display region of the display 102, and may therefore be represented using out-of-range display coordinates.

FIGS. 1A and 1B depict the system 100 from a perspective of the given eye, for illustration purposes. It may be understood by a person skilled in the art that FIGS. 1A-1B include simplified example implementations of the system 100, for sake of clarity, which should not unduly limit the scope of the claims herein. It is to be understood that the specific implementation of the system 100 is not to be construed as limiting it to specific numbers or types of displays, optical elements and processors. The person skilled in the art will recognize many variations, alternatives, and modifications of embodiments of the present disclosure.

Figure 2:
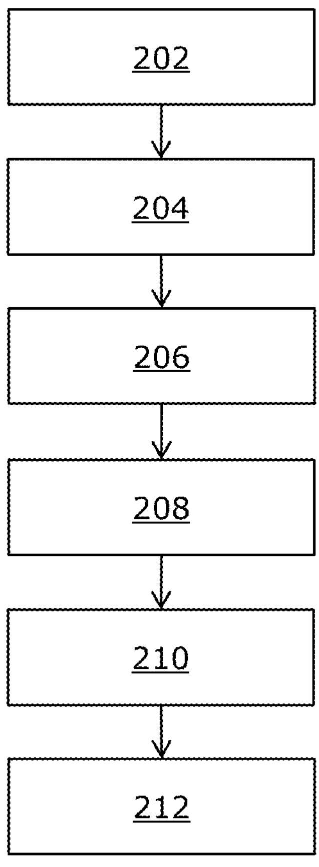
FIG. 2 depicts steps of a method incorporating image reprojection and optical distortion correction, in accordance with an embodiment of the present disclosure.

Referring to FIG. 2, illustrated are steps of a method incorporating image reprojection and optical distortion correction, in accordance with an embodiment of the present disclosure. At step 202, for a given position of a given eye, a mapping between a plurality of viewing-direction vectors originating from the given eye and corresponding display locations on a display is generated. At step 204, a mesh representing input content for the given position of the given eye is generated, the mesh comprising a plurality of vertices corresponding to respective locations on the input content. At step 206, for each vertex of the mesh, a reprojected vertex position is determined based on a position of said vertex relative to a reference, a pose of the reference when the input content was generated, and a predicted pose of the reference at or proximate to a display time. At step 208, for each vertex, a corresponding viewing-direction vector originating from the given eye and passing through the reprojected vertex position is determined. At step 210, for each vertex, a distortion-corrected display location on the display is determined by applying the mapping to the corresponding viewing-direction vector. At step 212, the plurality of vertices of the mesh are rasterized onto an eye-specific image buffer for the given eye, using respective distortion-corrected display locations of the plurality of vertices.

The aforementioned steps are only illustrative and other alternatives can also be provided where one or more steps are added, without departing from the scope of the claims herein.

The invention claimed is:

1. A system comprising:

a display; and at least one processor configured to:

generate, for a given position of a given eye, a mapping between a plurality of viewing-direction vectors originating from the given eye and corresponding display locations on the display;

generate a mesh representing input content for the given position of the given eye, the mesh comprising a plurality of vertices corresponding to respective locations on the input content;

determine, for each vertex of the mesh, a reprojected vertex position based on a position of said vertex relative to a reference, a pose of the reference when the input content was generated, and a predicted pose of the reference at or proximate to a display time;

determine, for each vertex, a corresponding viewing-direction vector originating from the given eye and passing through the reprojected vertex position;

determine, for each vertex, a distortion-corrected display location on the display by applying the mapping to the corresponding viewing-direction vector; and rasterize the plurality of vertices of the mesh onto an eye-specific image buffer for the given eye, using respective distortion-corrected display locations of the plurality of vertices.

2. The system of claim 1, wherein the at least one processor is configured to:

combine eye-specific image buffers of different eyes of at least one user, to produce an autostereoscopic image; and provide the autostereoscopic image for display.

3. The system of claim 1, wherein when generating the mapping, the at least one processor is configured to, for each viewing-direction vector originating from the given eye:

propagate said viewing-direction vector through an optical path of the system to determine a corresponding propagated ray;

determine an intersection of the corresponding propagated ray with the display; and assign, to said viewing-direction vector, a display location on the display based on the intersection.

4. The system of claim 1, further comprising an optical combiner arranged on an optical path of the display, wherein a semi-reflective surface of the optical combiner is curved, wherein when generating the mapping, the at least one processor is configured to, for each viewing-direction vector originating from the given eye:

determine an intersection of said viewing-direction vector with the semi-reflective surface of the optical combiner;

determine a corresponding reflection vector representing a reflection of said viewing-direction vector about a surface normal of the semi-reflective surface at the intersection; and determine a corresponding display location on the display at which the corresponding reflection vector intersects the display.

5. The system of claim 1, wherein when generating the mesh, the at least one processor is configured to adaptively subdivide at least a portion of the mesh based on at least one of:

a change in a depth value or a depth gradient across regions of the input content;

a change in a colour value or a colour gradient across regions of the input content;

a display-space size of at least a region of the input content;

a change in a gradient of the mapping between viewing-direction vectors and display locations;

a curvature of a region of an optical element arranged on an optical path of the display;

a rate of change in a reflected ray direction at a semi-reflective surface of an optical combiner across adjacent viewing-direction vectors;

a distance of a vertex to a nearest boundary of the input content.

6. The system of claim 1, wherein when generating the mesh, the at least one processor is configured to increase a mesh density in portions in which distortion-corrected display locations of adjacent vertices differ by more than a predefined threshold.

7. The system of claim 1, wherein when generating the mesh, the at least one processor is configured to increase a mesh density for regions of the input content that correspond to text.

8. The system of claim 1, wherein the at least one processor is configured to:

store the mapping as a lookup table; and interpolate between entries of the lookup table when determining distortion-corrected display locations.

9. The system of claim 8, wherein, when generating the mapping, the at least one processor is configured to:

determine a set of viewing-direction vectors that correspond to edges of the display;

determine a projection domain that encloses the set of viewing-direction vectors;

expand the projection domain by a predefined margin; and parameterize the plurality of viewing-direction vectors onto the expanded projection domain for storage in the lookup table.

10. A method comprising:

generating, for a given position of a given eye, a mapping between a plurality of viewing-direction vectors originating from the given eye and corresponding display locations on a display;

generating a mesh representing input content for the given position of the given eye, the mesh comprising a plurality of vertices corresponding to respective locations on the input content;

determining, for each vertex of the mesh, a reprojected vertex position based on a position of said vertex relative to a reference, a pose of the reference when the input content was generated, and a predicted pose of the reference at or proximate to a display time;

determining, for each vertex, a corresponding viewing-direction vector originating from the given eye and passing through the reprojected vertex position;

determining, for each vertex, a distortion-corrected display location on the display by applying the mapping to the corresponding viewing-direction vector; and rasterizing the plurality of vertices of the mesh onto an eye-specific image buffer for the given eye, using respective distortion-corrected display locations of the plurality of vertices.

11. The method of claim 10, further comprising:

combining eye-specific image buffers of different eyes of at least one user, to produce an autostereoscopic image; and providing the autostereoscopic image for display.

12. The method of claim 10, wherein generating the mapping comprises, for each viewing-direction vector originating from the given eye:

propagating said viewing-direction vector through an optical path of a system to determine a corresponding propagated ray, the system comprising the display;

determining an intersection of the corresponding propagated ray with the display; and assigning, to said viewing-direction vector, a display location on the display based on the intersection.

13. The method of claim 10, wherein generating the mapping comprises, for each viewing-direction vector originating from the given eye:

determining an intersection of said viewing-direction vector with a semi-reflective surface of an optical combiner arranged on an optical path of the display, wherein the semi-reflective surface is curved;

determining a corresponding reflection vector representing a reflection of said viewing-direction vector about a surface normal of the semi-reflective surface at the intersection; and determining a corresponding display location on the display at which the corresponding reflection vector intersects the display.

14. The method of claim 10, wherein generating the mesh comprises adaptively subdividing at least a portion of the mesh based on at least one of:

a change in a depth value or a depth gradient across regions of the input content;

a change in a colour value or a colour gradient across regions of the input content;

a display-space size of at least a region of the input content;

a change in a gradient of the mapping between viewing-direction vectors and display locations;

a curvature of a region of an optical element arranged on an optical path of the display;

a rate of change in a reflected ray direction at a semi-reflective surface of an optical combiner across adjacent viewing-direction vectors;

a distance of a vertex to a nearest boundary of the input content.

15. The method of claim 10, wherein generating the mesh comprises increasing a mesh density in portions in which distortion-corrected display locations of adjacent vertices differ by more than a predefined threshold.

16. The method of claim 10, wherein generating the mesh comprises increasing a mesh density for regions of the input content that correspond to text.

17. The method of claim 10, further comprising:

storing the mapping as a lookup table; and interpolating between entries of the lookup table when determining distortion-corrected display locations.

18. The method of claim 17, wherein generating the mapping comprises:

determining a set of viewing-direction vectors that correspond to edges of the display;

determining a projection domain that encloses the set of viewing-direction vectors;

expanding the projection domain by a predefined margin; and parameterizing the plurality of viewing-direction vectors onto the expanded projection domain for storage in the lookup table.

* * * * *